United States Patent
Krummel et al.

(10) Patent No.: US 8,787,569 B2
(45) Date of Patent: Jul. 22, 2014

(54) SYSTEM AND METHOD FOR SECURE COMMUNICATION OF COMPONENTS INSIDE SELF-SERVICE AUTOMATS

(75) Inventors: Volker Krummel, Paderborn (DE); Michael Nolte, Brakel (DE); Matthias Runowski, Salzkotten (DE); Johannes Bloemer, Paderborn (DE)

(73) Assignee: Wincor Nixdorf International GmbH (DE)

( * ) Notice: Subject to any disclaimer, the term of this patent is extended or adjusted under 35 U.S.C. 154(b) by 1087 days.

(21) Appl. No.: 12/603,836

(22) Filed: Oct. 22, 2009

(65) Prior Publication Data

US 2010/0310069 A1 Dec. 9, 2010

(30) Foreign Application Priority Data

Dec. 9, 2008 (DE) .......................... 10 2008 060 863

(51) Int. Cl.
*H04K 1/06* (2006.01)
(52) U.S. Cl.
USPC ................... 380/44; 380/30; 380/40; 380/41; 380/284; 380/285; 713/171; 713/183; 705/8; 705/40; 705/41
(58) Field of Classification Search
USPC .......... 713/176, 184, 171, 183; 705/40–43, 8; 235/379; 380/30, 40–44, 284, 285; 709/233
See application file for complete search history.

(56) References Cited

U.S. PATENT DOCUMENTS

| | | | |
|---|---|---|---|
| 5,220,501 A * | 6/1993 | Lawlor et al. .................... 705/40 |
| 5,873,276 A * | 2/1999 | Dawson et al. ................. 70/277 |
| 6,282,522 B1 * | 8/2001 | Davis et al. ...................... 705/41 |
| 6,609,114 B1 * | 8/2003 | Gressel et al. ................... 705/50 |
| 6,789,730 B1 | 9/2004 | Trelawney et al. |
| 7,278,024 B2 * | 10/2007 | Sundararajan et al. ........ 713/183 |
| 7,309,004 B1 * | 12/2007 | Muschellack et al. ........ 235/379 |
| 7,513,417 B2 * | 4/2009 | Burns et al. .................... 235/379 |
| 7,693,790 B2 * | 4/2010 | Lawlor et al. .................... 705/40 |
| 8,041,644 B2 * | 10/2011 | Ogg et al. ......................... 705/60 |
| 8,316,237 B1 * | 11/2012 | Felsher et al. ................. 713/171 |
| 8,474,700 B1 * | 7/2013 | Lewis et al. .................... 235/379 |
| 2002/0038289 A1 * | 3/2002 | Lawlor et al. .................... 705/42 |
| 2002/0042730 A1 * | 4/2002 | Homer .............................. 705/8 |

(Continued)

FOREIGN PATENT DOCUMENTS

EP 1 612 747 1/2006

OTHER PUBLICATIONS

A. Menezes et al., Handbook of Applied Cryptography, Chapter 9, "Hash Functions and Data Integrity", CRC Press, 1996.

(Continued)

*Primary Examiner* — Thu Ha Nguyen
(74) *Attorney, Agent, or Firm* — Harness, Dickey & Pierce, P.L.C.

(57) ABSTRACT

Method to secure the communication of components within self-service automats that are linked to each other by a bus system, having a transmitter and a receiver, characterized in that data are exchanged as tuples (C, A, R, N, Z) on the transport layer of the bus system where C are the message data M encrypted with an encryption key,
A are the message data M authenticated with an authentication key,
R represents the role of a component on the bus system of active or passive participants,
N represents a message counter,
Z represents a session counter.

19 Claims, 7 Drawing Sheets

(56) References Cited

U.S. PATENT DOCUMENTS

| | | | |
|---|---|---|---|
| 2002/0138446 A1* | 9/2002 | Antonin et al. | 705/67 |
| 2003/0236748 A1* | 12/2003 | Gressel et al. | 705/41 |
| 2004/0215564 A1* | 10/2004 | Lawlor et al. | 705/40 |
| 2005/0015604 A1* | 1/2005 | Sundararajan et al. | 713/184 |
| 2005/0021713 A1* | 1/2005 | Dugan et al. | 709/223 |
| 2005/0195975 A1* | 9/2005 | Kawakita | 380/30 |
| 2008/0114983 A1 | 5/2008 | Sherkin et al. | |
| 2010/0070448 A1* | 3/2010 | Omoigui | 706/47 |
| 2010/0114769 A1* | 5/2010 | Carpenter et al. | 705/43 |
| 2010/0138485 A1* | 6/2010 | Chow et al. | 709/203 |
| 2011/0113067 A1* | 5/2011 | Homer | 707/783 |
| 2011/0307703 A1* | 12/2011 | Ogg et al. | 713/176 |
| 2012/0290950 A1* | 11/2012 | Rapaport et al. | 715/753 |

OTHER PUBLICATIONS

A.S. Tanenbaum, Computer Networks, Fourth Edition, Sep. 8, 2002, pp. 161-188, XP002565530.

T. Dierks, et al., Network Working Group, "The Transport Layer Security (TLS) Protocol", Version 1.2, Aug. 2008, pp. 1-104, XP015060256.

* cited by examiner

SYSTEM AND METHOD FOR SECURE COMMUNICATION OF COMPONENTS INSIDE SELF-SERVICE AUTOMATS

BACKGROUND OF THE INVENTION

1. Technical Field

The invention relates to a system and a method for securing the communication of components within self-service automats, in particular automated teller machines.

2. Discussion

Self-service automats often have a series of components that have to be linked to each other. Usually, these automats have a standardized PC platform that meets special security requirements. Keypads, cash dispensing automats, card readers, monitors and other devices are connected to this PC platform (motherboard), by USB interfaces for example.

These automats further include the possibility of connecting to another computer so that a maintenance engineer, for example, can connect to the self-service automat using his laptop.

A situation of this type exists, for example, when the engineer would like to test the money dispensing unit. Using a test program that is installed on the laptop, he can connect to the dispensing unit in order to dispense bills for test purposes. In addition, instances are known in which persons use this technology in order to procure cash in an unauthorized fashion. This latter is achieved by circumventing or manipulating physical security mechanisms.

Furthermore, security-sensitive cases are known in which a person using a USB tracer (a device that listens in on the traffic on the USB interface) switches to the line of the dispensing unit and the PC for the purpose of analyzing control commands, manipulating them and re-entering commands overheard in order to obtain cash in an unauthorized manner in this way. Furthermore, cases are known in which a person using a USB tracer interposes himself between the line for the card reader and the PC in order to obtain card data in an unauthorized manner.

The present invention is not categorically restricted to USB; however, USB is a dominant standard for peripheral devices on computers so that in what follows the discussion will center essentially on USB. However, it should be noted that all other connecting standards that may similarly be wireless and follow a similar concept to USB, are to be covered by the invention.

USB is a serial-bit bus, the individual bits of the data package are transmitted sequentially. Data transmission takes place symmetrically over two twisted wires, one of which transmits the data signal unchanged, the other the inverted signal. The signal receiver creates the voltage differential between the two signals; the voltage swing between levels 1 and 0 is consequently twice as great, irradiated interference is largely eliminated. This increases transmission security, suppresses interference and improves electromagnetic compatibility. Two additional wires are used for the power feed to the attached devices. By using only four strands in one cable, said strands can be made thinner and more economically than with parallel interfaces. A high data transmission rate can be achieved at relatively low cost since it is not necessary to transmit several signals with identical electrical and chronological profiles.

The bus specification provides for a central host controller (master) that assumes coordination of the connected peripheral devices (the slave clients). Theoretically, up to 127 different devices can be connected to the host controller. Only one USB device can be connected to a USB port at a time. If several devices are to be connected to a host, a distributor (hub) must handle the connection. The result of using hubs is the creation of tree structures that all end in the host controller.

In spite of its name—Universal Serial Bus—the USB is not a physical data bus. In a bus of this kind, several devices are connected in parallel to one line. The designation "bus" refers to the logical networking, the actual electrical implementation is carried out using only point-to-point connections.

A USB stack on which the appropriate USB drivers for the devices sit is used to manage information and data transmitted over the USB bus. The USB stack is responsible for the assignment of information to the individual device drivers.

FIG. 1 shows a stack structure of this kind for two devices. The left column represents the stack structure for a system PC that basically controls the automated teller machine. The RM3 device is a peripheral device that is connected to the system PC over a USB bus for example. This peripheral device may be, for example, an automated teller machine or a card reader in which in turn an operating system is similarly located that manages the USB interface. It can be seen that the system PC has a JDD (Java device driver) layer that is responsible for loading the drivers. Below said JDD is located an object request broker (ORB). The USB transport layer, which in turn sits on the USB driver, is located below said ORB.

It must be noted that the USB technology has no form of security functions so that the manipulations described above can occur.

SUMMARY OF THE INVENTION

An object of the present invention is to ensure the security of a connecting channel that connects a main control unit (PC module) to peripheral devices. In real terms, the authenticity and the confidentiality of messages on this channel are realized using a combination method. A further object is to provide error tolerance and to prevent old messages from being re-entered.

The preferred embodiment of the invention concerns methods for securing the communication of components within self-service automats that are connected to each other via a bus system. Such components may be the main board (usually a PC-based motherboard), the card reader, the keypad, the cash dispensing system, screen, etc. A basic distinction is made between an active component (transmitter) and a passive component (receiver). These components are preferably connected by a serial bus system, such as the USB bus. Naturally, no restriction regarding the bus system should exist. Both wireless and wired bus systems can be used. With the USB bus system, for example, encryption is not specified by the standard so that said encryption has to take place at the transport level of the bus system. In so doing, the data are exchanged as tuples (C, A, R, N, Z). The tuple may be configured as a binary record in different forms. The data can also be transmitted in a different sequence or in separate packages. The tuple is intended solely to express the logical relationship. In this tuple, C are the message data M encoded with an encryption key, A are the message data M authenticated with an authentication key, R represents the role of a component on the bus system as active or passive participant (transmitter or receiver), N represents a message counter, Z represents a session counter. The function of the session counter is to see that the key is changed regularly for a new session. Known algorithms can be used on both sides for implementation. Examples from the prior art are:

AES, DES and any other block ciphers in corresponding operating modes. Details are known to one skilled in the art. In a further embodiment, the above named tuple is expanded so that it now reads (C, A, R, N, Z, $\hat{N}$, $\hat{Z}$), where $\hat{N}$ is a message counter of the $\Delta$-last messages N, $\hat{Z}$ is a last session counter of the $\Delta$-last messages. Through $\Delta$, it can always be specified that the last messages in the transmission are allowed be lost without the need to inform the application layer above it. The transmitter of a channel notes the session number $\hat{Z}$ and message number $\hat{N}$ of the last $\Delta$-last messages and, in addition to the pair (N, Z), also sends the pair ($\hat{Z}$ $\hat{N}$) as the current session counter in each message so that a check is possible at the receiver. If fewer than $\Delta$ messages have now been lost, no error message is generated. This is always possible when redundancies in data transmission exist. The $\Delta$ can be set as a parameter, e.g. by the layer above. A loss of information can occur, for example, when cables are pulled out or other manipulations are carried out to the connection.

The security measures are based on a key for authentication and a key for encryption. Keys are used that are created when the self-service automats are produced and assembled, and filed securely in the components.

The keys can be filed in a Trusted Platform Module (TPM), for example, such as is known commercially. The Trusted Platform Module (TPM) is a chip that, as part of the TCG specification (formerly TCPA), restricts computers or other devices that can execute the commands of the TPM. This serves the purposes of license protection and data protection (privacy) for example. The chip is the equivalent of a permanently installed smartcard with the important difference that it is not tied to a specific user (user instance) but to a single computer (hardware instance). Besides its use in PCs, the TPM can be integrated into PDAs, mobile telephones, and entertainment electronics. A device with TPA can no longer be used counter to the interests of the hardware maker, the operator of the licenses or the owner of data by means of software that carries out the commands of the TPM. A benefit for the individual user of a computer is not defined, except in protection against misuse by unauthorized third parties.

The chip is passive and cannot affect either the booting process or operation directly. It contains an unambiguous code and serves to identify the computer.

Authentication is made on the basis of a known authentication algorithm by A:=Auth[$K_{auth}^R$, N, M, |M|], where $K_{auth}^R$ is the result of a secure key generation procedure using a common key K and C:=ENC[$K_{enc}^R$, Z, N, M], where $K_{enc}^R$ is the result of a secure key generation procedure using a common key K. In the preferred embodiment, said keys are determined by a hash function. Details can be found farther below.

To ensure that no data of any kind is lost, a message counter is used that is incremented up to a predetermined natural number at each transmission.

In detail, the following steps should be carried out when transmitting, check whether the message counter N<$N_{max}$, if this is given, set N:=N+1.

When receiving, the following steps are performed, assuming that the last session counter is $\overline{Z}$ and the last message counter is $\overline{N}$.

Check whether session number Z≤$Z_{max}$,
Check whether message number N≤$N_{max}$
Compare the tuples (Z,N) and ($\overline{Z}$,$\overline{N}$), if more than $\Delta$ messages have been lost, an error is generated, otherwise,
Carry out decryption
Carry out authentication At the receiver, the decryption is carried out as follows M':=DEC[$K_{dec}^R$,C]; authentication is given if A=A' where A':=Auth[$K_{ver}^R$, N, M', |C|], The method can be used with self-service automats that were mentioned previously, where the component may be both the receiver and the transmitter. Usually, the communication is bi-directional so that receiver and transmitter assume both functions.

BRIEF DESCRIPTION OF THE DRAWINGS

The figures show possible embodiments that are not to be construed in a restrictive sense but are intended only to improve understanding of the invention.

DESCRIPTION OF THE PREFERRED EMBODIMENTS

Figure 1:
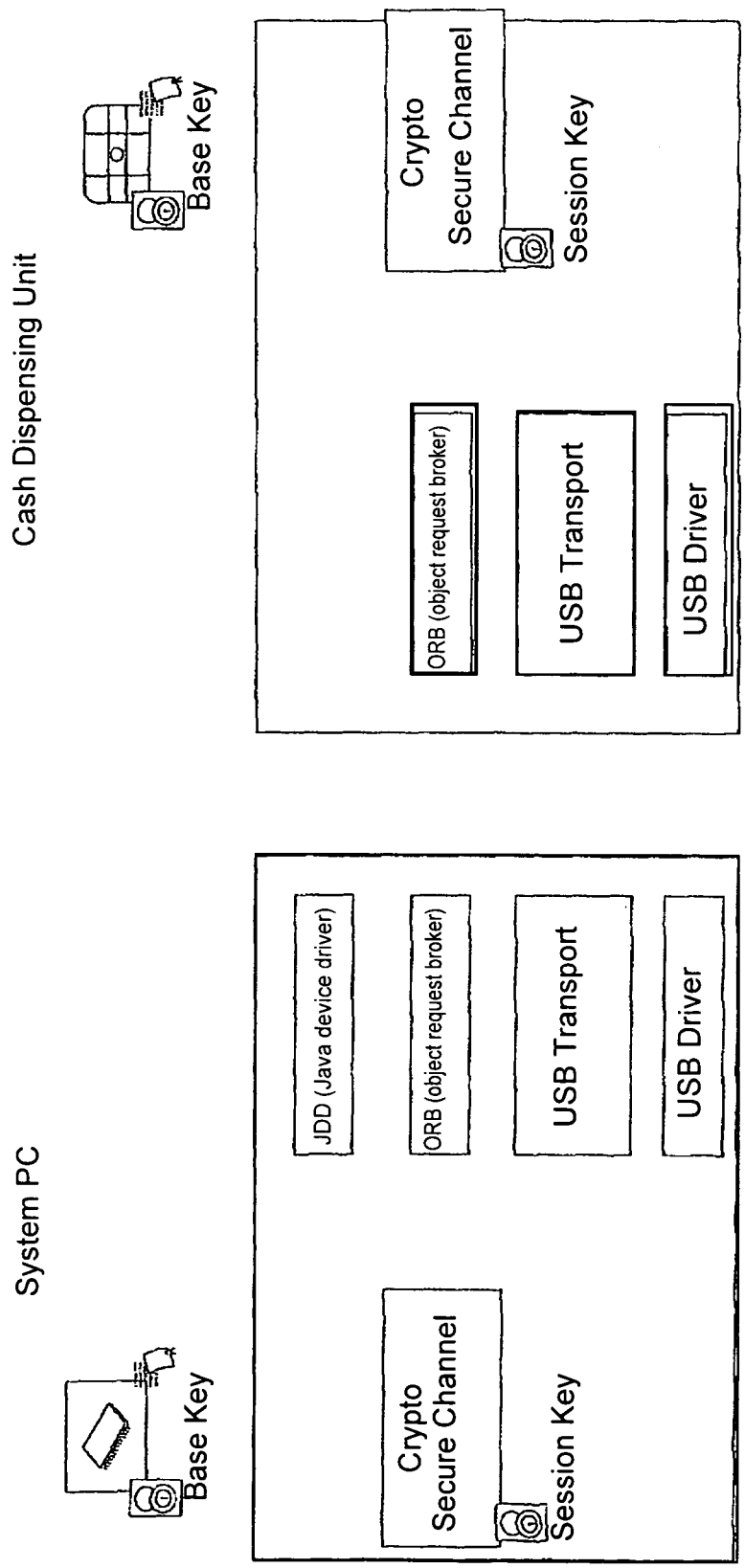
FIG. 1 shows the stack structure of two self-service components, in this case, a system PC is involved on the one side and an RM3 card reader on the other side.

The encrypting model is explained in detail below for a better understanding.

In the first step a description is given of the designator or variables for the secure channel protocol:

| | |
|---|---|
| A, B | Participants in the protocol |
| R ∈ {A, B} | Designator of the active protocol participant |
| R' ∈ {A, B}\{R} | Designator of the passive protocol participant |
| $N_{max}$ | Maximum number of messages per session |
| $Z_{max}$ | Maximum number of sessions |
| HASH [.] | Cryptographically secure hash function, for example SHA 1, SHA 256, MD5, etc. |
| AUTH [.] | Cryptographically secure message authentication, for example by means of HMAC, CBC, MAC ISO9797-1 |
| ENC [.] | Cryptographically secure encryption procedure, for example by means of AES, DES, |
| K | Common, long-life key of A and B |
| A → B | Session in which A sends messages to B |
| B → A | Session in which B sends messages to A |
| $Z_{A→B}^A$ | Session counter of A for the session A → B (persistent) |
| $Z_{B→A}^A$ | Session counter of A for the session B → A (persistent) |
| $Z_{A→B}^B$ | Session counter of B for the session A → B (persistent) |
| $Z_{B→A}^B$ | Session counter of B for the session B → A (persistent) |
| $N_{A→B}^A$ | Message counter of A for the session A → B |
| $N_{A→B}^B$ | Message counter of B for the session A → B |
| $N_{B→A}^A$ | Message counter of A for the session B → A |
| $N_{B→A}^B$ | Message counter of B for the session B → A |
| $\Delta \in N$ | Tolerated length of a sequence of messages that do not reach their recipient |

Functions can be derived from the RC4 algorithm, Temporal Key Integral protocol, MD2, MD4, MD5, SHA, RIPEMD-160, Tiger HAVAL Whirlpool, LM hash NTLM (hash). RSA, AES, etc. can be used as encrypting procedures.

Basically there is a data dependency. After all the messages sent from transmitter A have arrived at the respective receiver B, the following conditions apply:

| A | B |
|---|---|
| $K =$ | $K$ |
| $Z_{A \to B}^A = (\geq)$ | $Z_{A \to B}^B$ |
| $Z_{B \to A}^A = (\leq)$ | $Z_{B \to A}^B$ |
| $N_{A \to B}^A = (\geq)$ | $N_{A \to B}^B$ |
| $N_{B \to A}^A = (\leq)$ | $N_{B \to A}^B$ |

This table means that the common key is identical, the session counter is the same or greater. If packages are lost, or if the key was just incremented, the session counter may be higher, the same applies to the message counter.

Basically, two cases have to be differentiated. In the first case, a package loss is not allowed (thus $\Delta=0$) in the second case a package loss is allowed because of redundancy ($\Delta \geq 0$)

Case $\Delta=0$

First a Common Session Counter is Calculated

Entry: Common key K, role $R \in \{A,B\}$
  Session $S \in \{\text{'A}\to\text{B'},\text{'B}\to\text{A'}\}$, session counter $Z_S^R$
  $KS_S^R := \text{HASH}[K, \text{'ENC'}, S, Z_S^R]$
  $KA_S^R := \text{HASH}[K, \text{'AUTH'}, S, Z_S^R]$
  If R=A and S='A→B'
    1. $K_{enc}^A := KS_S^R$
    2. $K_{auth}^A := KA_S^R$
  If R=A and S='B→A'
    1. $K_{dec}^A := KS_S^R$
    2. $K_{ver}^A := KA_S^R$
  If R=B and S='A→B'
    1. $K_{dec}^B := KS_S^R$
    2. $K_{ver}^B := KA_S^R$
  If R=B and S='B→A'
    1. $K_{enc}^B := KS_S^R$
    2. $K_{auth}^B := KA_S^R$ When starting a new session, the following must be taken into account:

Entry: Common key K, role $R \in \{A,B\}$,
  Session $S \in \{\text{'A}\to\text{B'},\text{'B}\to\text{A'}\}$ (i.e. data from A towards B and vice versa) new session counter Z
  1. $Z_S^R := Z //$default $Z = Z_R^S + 1$
  2. Calculate common session key
  3. $N_{R \to R'}^R := 0$ Send Message:

Entry: Message M, role $R \in \{A, B\}$, message counter $N_{R \to R'}^R$, session counter $Z_{R \to R'}^R$
  1. Check message counter $N_{R \to R'}^R < N_{max}$
  2. Increment message counter $N_{R \to R'}^R := N_{R \to R'}^R + 1$
  3. $Z := Z_{R \to R'}^R$;
  4. $N := N_{R \to R'}^R$
  5. $A := \text{AUTH}[K_{auth}^R, N, M, |M|]$
  6. $C := \text{ENC}[K_{enc}^R, N, M]$
  7. Send (C, A, R, N, Z)

Receive Message:

Entry: Cipher text C. authentication A, role $R \in \{A, B\}$, message number N,
  Session number Z, message counter $N_{R \to R'}^R$
session counter $Z_{R \to R'}^R$
  1. Check session number $[Z \leq N_{max}]$, $[Z \geq Z_{R \to R'}^R] \to$start new session
  2. Check message number $[N \leq N_{max};]$, $[N = N_{R \to R'}^R + 1]$
  3. Calculate $M' := \text{DEC}[K_{dec}^R, C, N]$
  4. Calculate $A' := \text{AUTH}[K_{ver}^R, N, M', |C|]$
  5. Check A=A'

In the following, the protocol for $\Delta>0$, in which packages are allowed to be lost because of the redundancy in the higher layer will be described.

In the following it is to be permissible that sequences from $\Delta>0$ of successive messages may be lost during transmission without an error being displayed. The transmitter for a channel notes the session number $\hat{Z}$ and message number $\hat{N}$ of the last $\Delta$ messages and also includes in each message, in addition to the pair (current session counter, current message counter), the pair $(\hat{Z},\hat{N})$. The receiver on the other side notes the session counter $\overline{Z}$ and message counter $\overline{N}$ of the respective last message that it received. In order to check whether a sequence of more than $\Delta$ successive messages has been lost, the receiver compares the pairs $(\hat{Z},\hat{N})$ and $(\overline{Z},\overline{N})$ component by component. It can then decide whether, after the last message received, the transmitter sent still more than $\Delta$ many messages or not.

Start New Session

Entry: Common key K, role $R \in \{A,B\}$,
  Session $S \in \{\text{'A}\to\text{B'},\text{'B}\to\text{A'}\}$
  1. $Z_S^R \leftarrow Z_S^R + 1 //$larger jumps should not be permitted
  2. Calculate common session key
  3. $N_S^R := 1 //$Initialization of message counter The following steps are performed at the transmitter.

Send Message

Entry: Message M, role $R \in \{A, B\}$, message counter $N_{R \to R'}^R$, session counter $Z_{R \to R'}^R$
  Old message counter for the $\Delta$-last message $\hat{N}_{R \to R'}^R$
  Last session counter for $\Delta$-last message $\hat{Z}_{R \to R'}^R$ Steps that Run
  1. Check message counter $N_{R \to R'}^R < N_{max}$, otherwise start new session
  2. Advance message counter $N_{R \to R'}^R := N_{R \to R'}^R + 1$
  3. $A := \text{AUTH}[K_{auth}^R, N_{R \to R'}^R, Z_{R \to R'}^R, \hat{N}_{R \to R'}^R, \hat{Z}_{R \to R'}^R, |M|, M]$
  4. $C := \text{ENC}[K_{enc}^R, Z, N, M]$
  5. Send $(C, A, R, N_{R \to R'}^R, Z_{R \to R'}^R, \hat{N}_{R \to R'}^R, \hat{Z}_{R \to R'}^R)$ The following steps are performed at the receiver.

Receive Message:

Entry:
  Cipher text C, authentication A, role R,
  Current message counter $N_{R \to R'}^R$, current session counter $Z_{R \to R'}^R$
  $\Delta$-last message counter $\hat{N}_{R \to R'}^R$, $\Delta$-last session counter $\hat{Z}_{R \to R'}^R$
  Last session counter $\overline{Z}$, last message counter $\overline{N}$ Steps that Run
  1. Check session number $[Z \leq Z_{max}]$
  2. Check message number $[N \leq N_{max}]$
  3. Compare tuples $(\hat{Z}_{R \to R'}^R, \hat{N}_{R \to R'}^R)$ with $(\overline{Z},\overline{N})$ error, more than $\Delta$ messages lost
  4. Calculate $M' := \text{DEC}[K_{dec}^R, C, N]$
  5. Calculate $A' := \text{AUTH}[K_{auth}^R, N_{R \to R'}^R, Z_{R \to R'}^R, \hat{N}_{R \to R'}^R, \hat{Z}_{R \to R'}^R, |M|, M]$
  6. Check A=A'

In the following, the Figures that were mentioned above will be described in more detail.

FIG. 1 shows a system PC that is connected over a USB interface to a peripheral device, in this case a card reading device, or alternatively to a cash dispensing device (RM3). The system PC has different layers. First, the USB driver that sits directly on the hardware must be named. Then, above that is the USB transport layer that serves to transmit data and at which level encryption takes place. Above that, is an object request broker (ORB). A Java driver manager (JDD/Java device driver) is disposed thereon in turn. Furthermore, there is an encryption module that has access to a session key and thus prepares a secure channel. The session key is derived from a base key. The card reading device in turn similarly derives its session key from a base key and has a similar structure.

Figure 2:
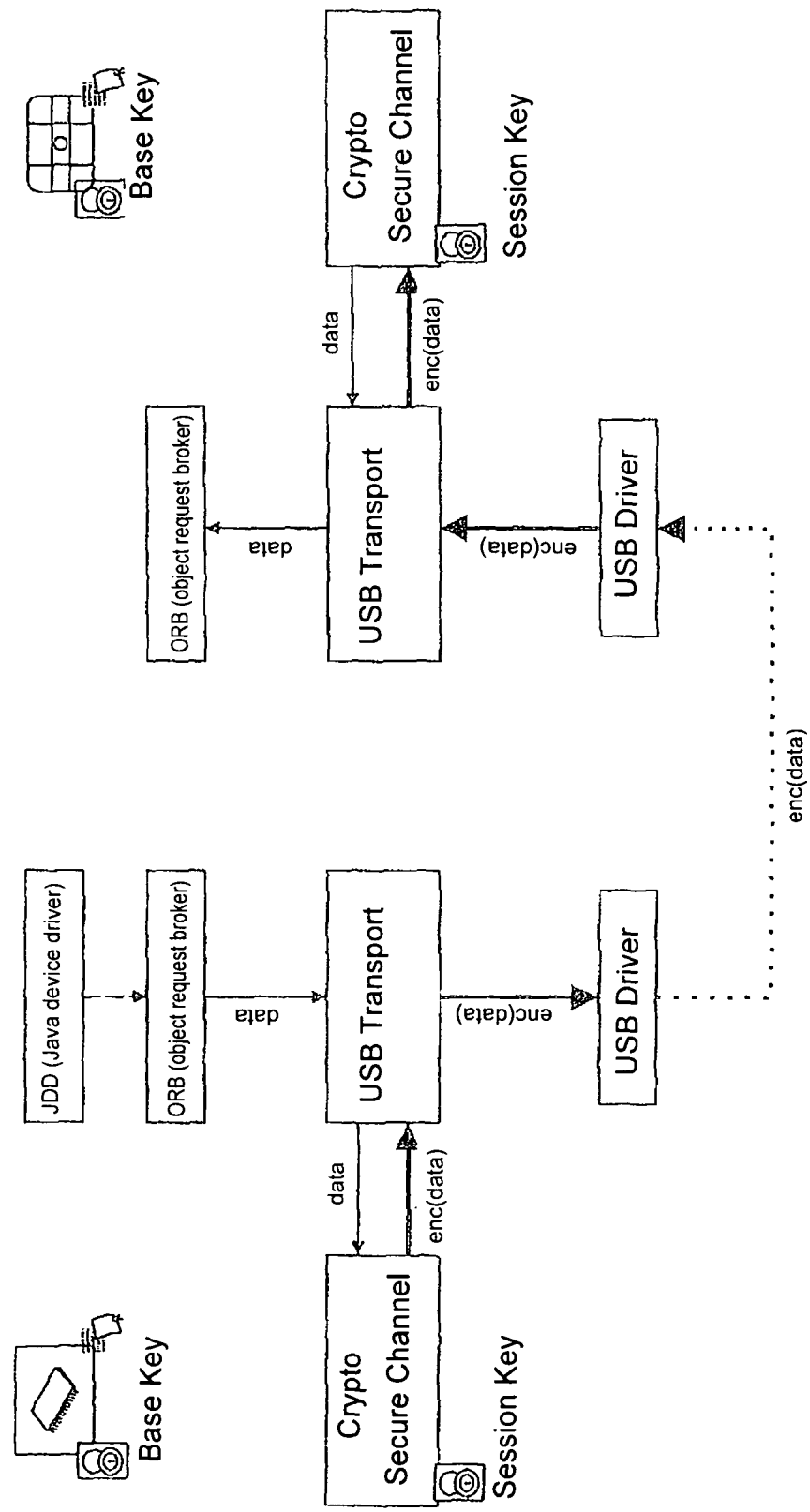
FIG. 2 shows the communication of the devices from FIG. 1 across the layers of the software.

FIG. 2 shows the data flow between the two devices with reference to FIG. 1. Up to the USB transport layer, the data are unencrypted in order to have them encrypted by the encryption module. Then these data are transmitted encrypted in order for them to be decrypted again at the receiving device.

Figure 3:
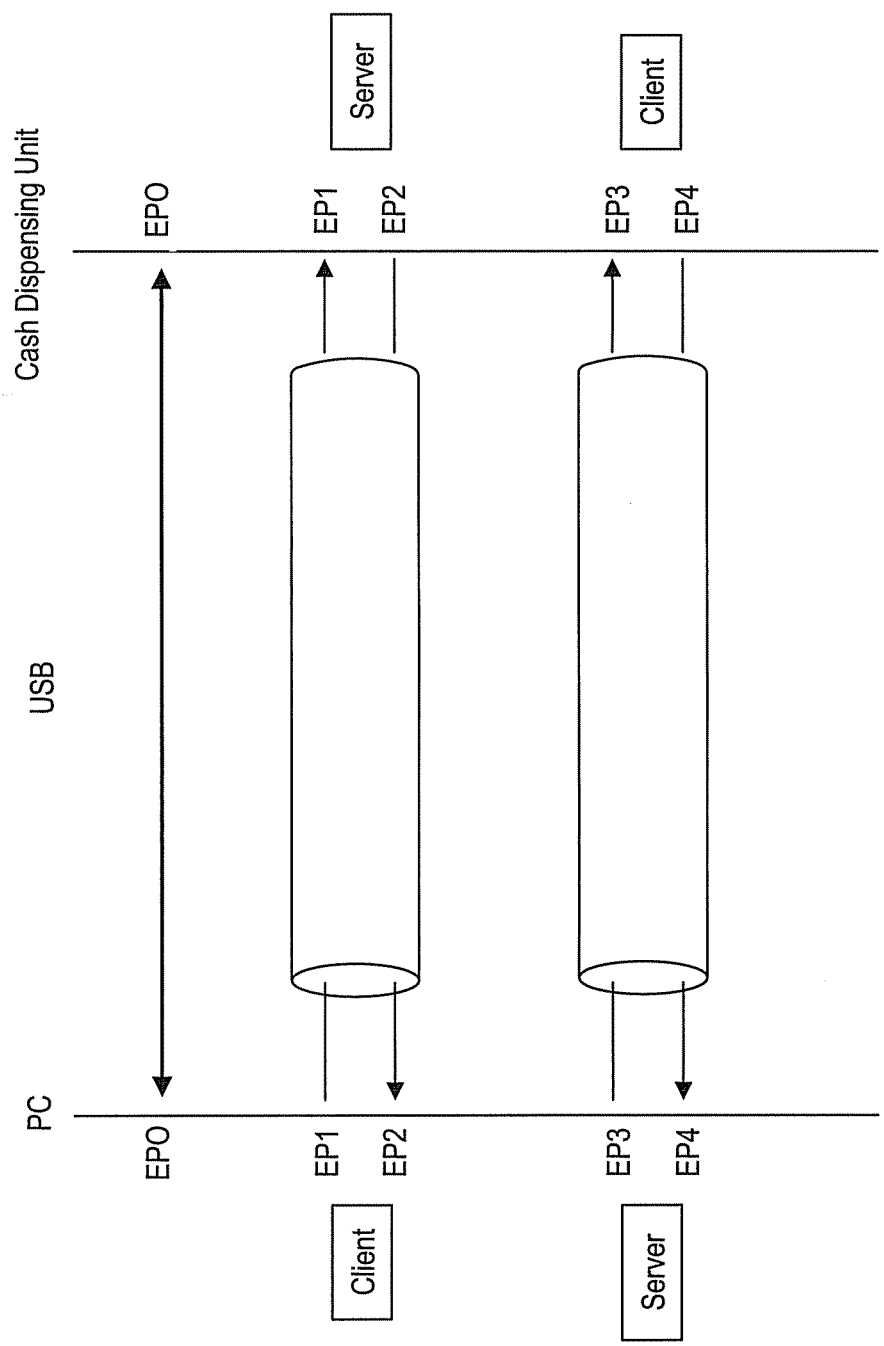
FIG. 3 shows communication over the USB bus system.

FIG. 3 shows the USB data connection with the different active and passive alignment of the components. This session EP0 is, for example, unencrypted. Sessions EP1 and EP2 are encrypted, where the PC is the client (passive) and the RM3 is the server (active). Sessions EP3 and EP4 in turn are similarly encrypted, where here the PC is the active participant and the card reading device is the passive participant.

Figure 4:
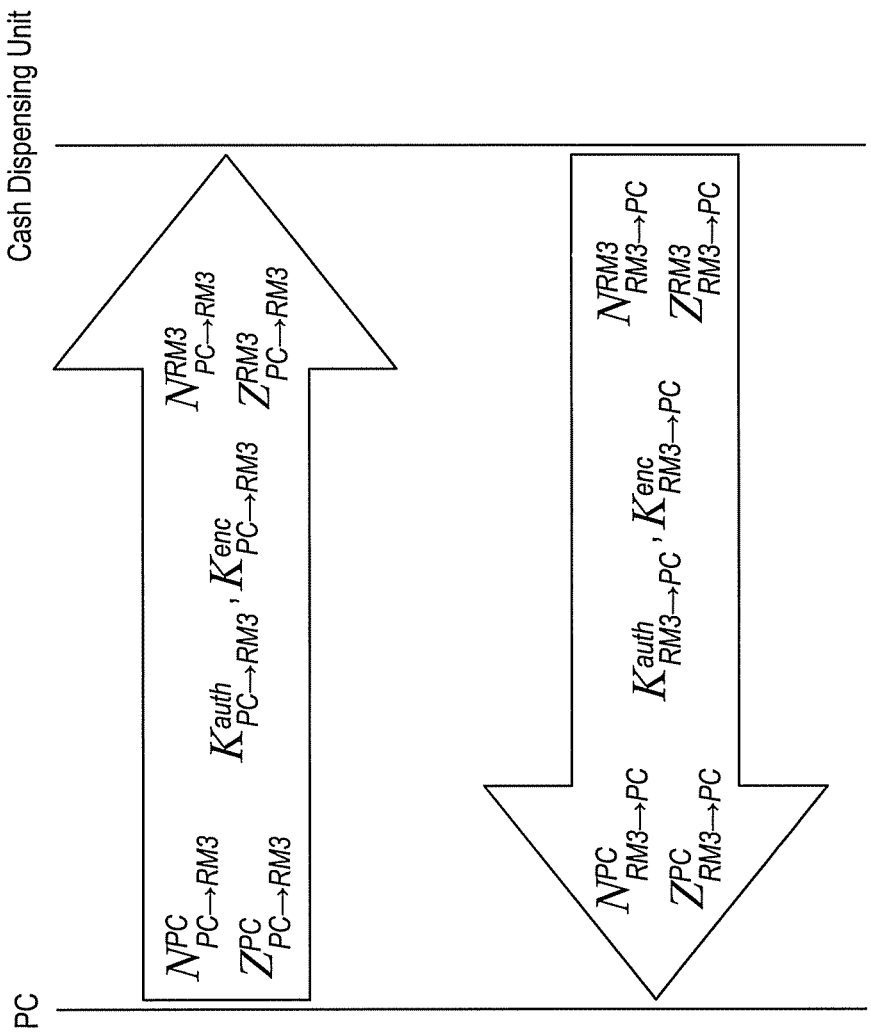
FIG. 4 shows the encrypted communication over the bus system.

On the basis of FIG. 3, FIG. 4 shows the encrypted information that is exchanged between the devices, where an appropriate encryption key and an authentication key are used. Details are described above.

Figure 5:
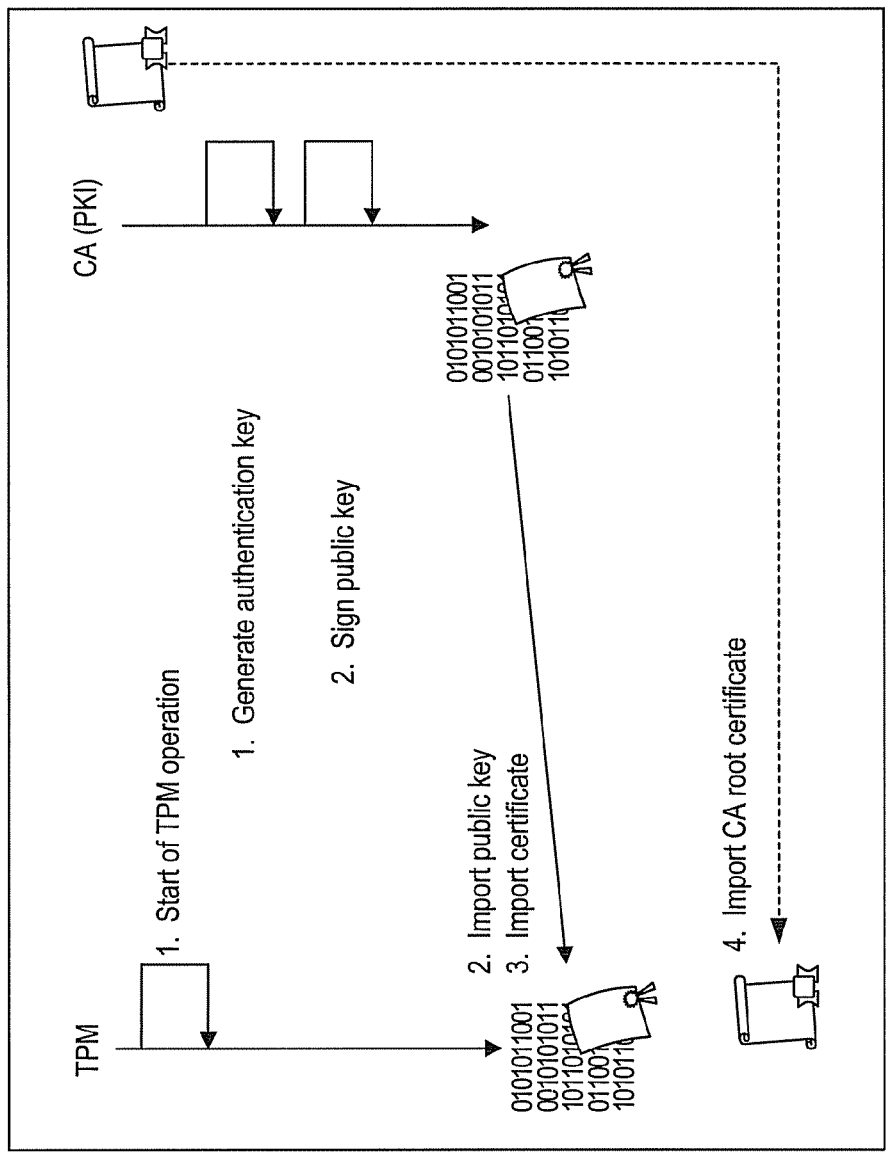
FIG. 5 shows the steps when generating the common key when the PC motherboard is started up, and when filing in the TPM.
Figure 6:
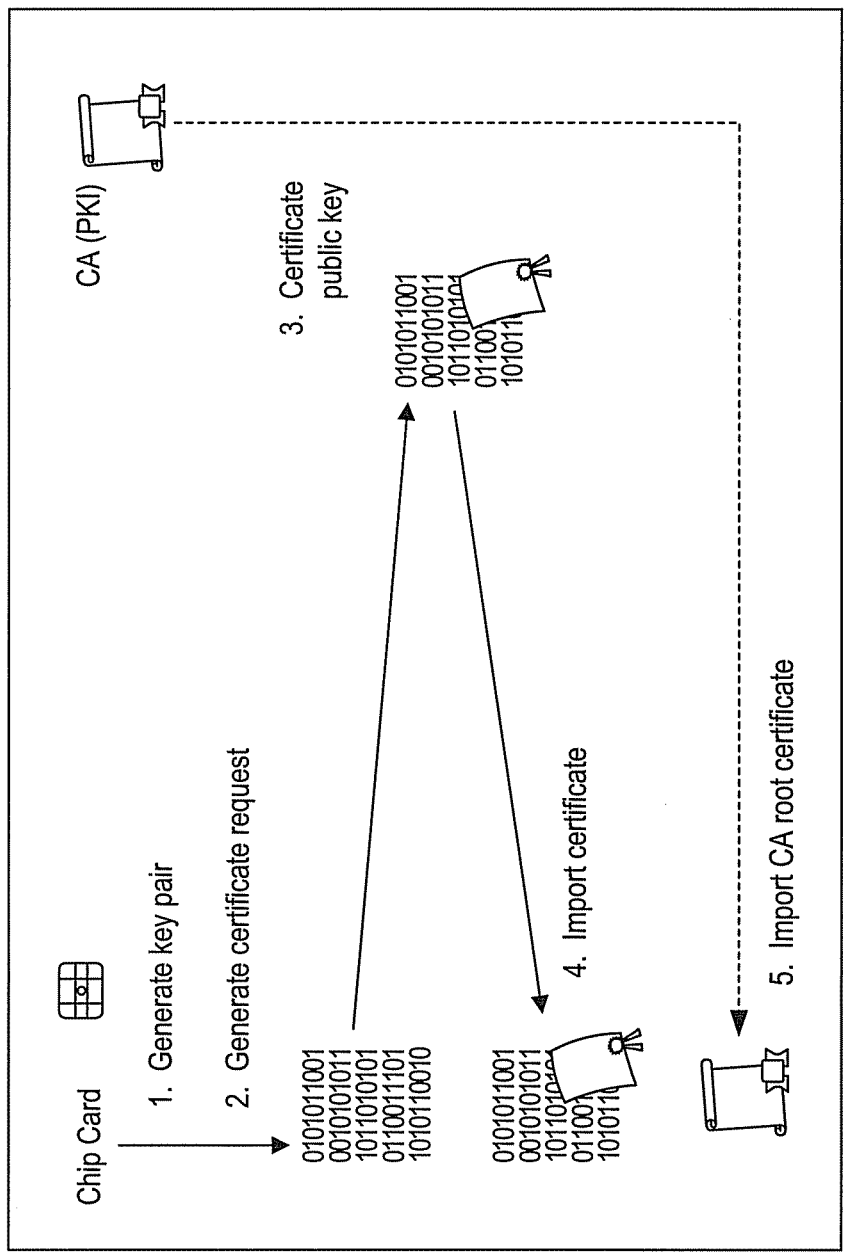
FIG. 6 shows the steps from FIG. 5 for the card reader.
Figure 7:
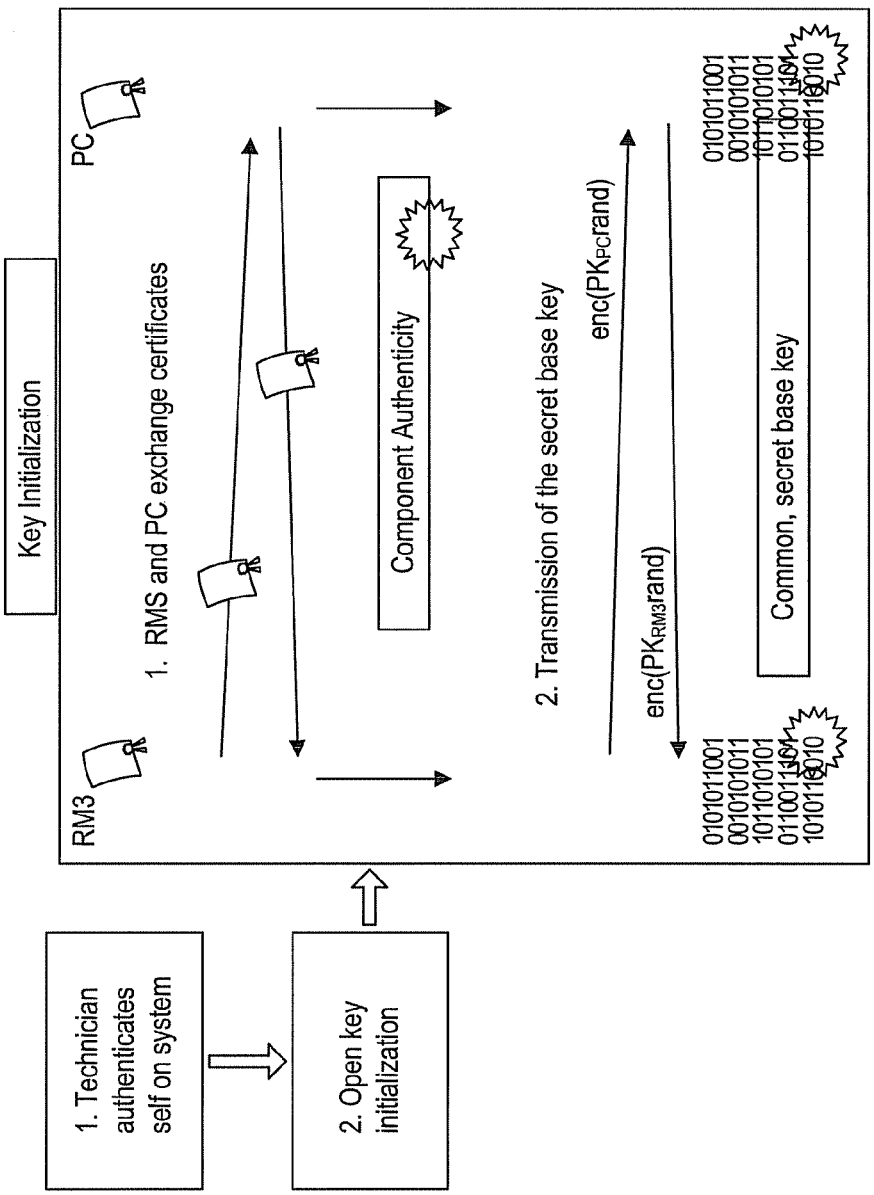
FIG. 7 shows the initialization of the keys between the card reader and the PC.

FIGS. 5-7 shows the generation of the common key K that is generated at the time the apparatus is originally assembled.

FIG. 5 shows the initialization of the PC with a TPM module. On the basis of a PKI (public key infrastructure), an authentication key is generated, and said key is then signed publicly. Then the public key and a suitable certificate are imported. Then the root certificate is imported from the PKI. All this information is deposited in the TPM.

In the RM3 module, or in the chip card reader, a key pair is generated, and a request is made to the PKI to certify a public key. Then this public key is certified, and in the next step said key is imported again into the component of the self-service automat. Further, the CA root certificate of the PKI is imported. After both components have been prepared, said components are connected to each other, and the steps described in FIG. 7 are performed. A technician authenticates himself to the system and requests the system to carry out a key initialization. Then the components communicate with each other. The two components exchange their certificates and inspect said certificates. If it turns out that the certificates are correct, a secret base key is transmitted in code. The above named algorithms build on this common base key.

What is claimed is:

1. A method for securing communication of components inside a self-service automat that are connected to each other by a bus system, with a transmitter and a receiver, comprising:
    exchanging data as tuples (C, A, R, N, Z) between the transmitter and the receiver on a transport layer of the bus system, wherein
    C are message data M encrypted with an encryption key,
    A are message data M authenticated with an authentication key,
    R represents a participant role of a component on the bus system of active or passive participants,
    N represents a message counter, and
    Z represents a session counter,
    determining while transmitting from the transmitter to the receiver, whether Z is less than a maximum session number $Z_{max}$;
    determining whether N is less than a maximum message number $N_{max}$;
    comparing a tuple $(\hat{Z},\hat{N})$ to a tuple $(\overline{Z},\overline{N})$, wherein $\hat{Z}$ is a session number for Δ-last messages, $\hat{N}$ is a message number for Δ-last messages, $\overline{Z}$ is a last session counter, and $\overline{N}$ is a last message counter;
    generating, based on the comparing, an error if more than Δ messages have been lost;
    decrypting message data, based on the comparing, if not more than Δ messages have been lost;
    upon decrypting the message data, authenticating the message data;
    decrypting the message data based on a $K_{dec}^{R}$ and C, wherein $K_{dec}^{R}$ is a result of a key generation procedure using a common key K;
    comparing A to an authentication value A' at the receiver, wherein A' is determined based on $K_{ver}^{R}$, N, the decrypted message data, and |C|, wherein $K_{ver}^{R}$ is a result of a key generation procedure using a common key K; and
    authenticating the decrypted message data, based on the comparing of A to A', if A is equal to A'.

2. The method of claim 1, further comprising:
    exchanging data as a tuple $(C, A, R, N, Z, \hat{N}, \hat{Z})$ between the transmitter and the receiver on the transport layer of the bus system, where $\hat{N}$ is a message counter for Δ-last messages N and $\hat{Z}$ is a last session counter for Δ-last messages.

3. The method of claim 2, further comprising:
    allowing Δ-last messages to be lost during the exchanging the data without informing an application layer;
    transmitting from the transmitter to the receiver, a pair $(\hat{Z},\hat{N})$ as a current session counter; and
    upon the exchanging the data, enabling a check at the receiver.

4. The method of claim 1, wherein the encryption key and the authentication key are a common key K, securely filed in the components, that was generated at the time of production and assembly of the self-service automat on a basis of certificates from a public key infrastructure (PKI).

5. The method of claim 4, wherein the common key K is stored in a Trusted Platform Module (TPM).

6. The method of claim 1, wherein A:=AUTH[$K_{auth}^{R}$, N, M, |M|], where $K_{auth}^{R}$ is the result of a key generation procedure using a common key K.

7. The method from one or more of the preceding claims, further comprising:
    determining, while transmitting from the transmitter to the receiver, whether the message counter N is less than a maximum message counter $N_{max}$;
    and upon the determining whether N is less than $N_{MAX}$, IF N is less than $N_{MAX}$, setting N:=N+1.

8. The method of claim 1, wherein the self-service automat is an automated banking machine.

9. The method of claim 1 or 6, wherein C:=ENC[$K_{enc}^{R}$, Z, N, M], where $K_{enc}^{R}$ is the result of a key generation procedure using a common key K.

10. The method of claim 1, wherein the bus system is a universal serial bus (USB).

11. A system for securing communication of components inside self-service automats comprising:
    a plurality of components, inside a self-service automat, including a first component and a second component, the first component being a transmitter in communication with the second component, being a receiver, wherein the first and second components are on a bus system;
    a plurality of configured computing units, including a first computing unit in communication with the first component and a second computing unit in communication with the second component; and
    the bus system having a transport layer, wherein data are exchanged between the first component and the second component as tuples, wherein
    C are message data M encrypted with an encryption key,
    A are message data M authenticated with an authentication key,
    R represents a participant role of a component on the bus system, wherein R includes active and passive,
    N represents a message counter, and
    Z represents a session counter, wherein the second computing unit:
  determines whether Z is less than a maximum session counter $Z_{max}$;
  determines whether N is less than a maximum message counter $N_{max}$;
  compares a tuple $(\hat{Z},\hat{N})$ to a tuple $(\overline{Z},\overline{N})$, wherein $\hat{Z}$ is a session counter for Δ-last messages, $\hat{N}$ is a message counter for Δ-last messages, $\overline{Z}$ is a last session counter, and $\overline{N}$ is a last message counter;
  generates, based on the comparison, an error if more than Δ messages have been lost;
  decrypts message data, based on the comparison, if not more than Δ messages have been lost; and
  upon the decryption of the message data, authenticates the decrypted message data;
  wherein the second computing unit decrypts the message data based on $K_{dec}^R$ and C, where $K_{dec}^R$ is a result of a key generation procedure using a common key K; and
  wherein the second computing unit authenticates the decrypted message data, based on a comparison of A and A', if A is equal to A', wherein A' is determined based on $K_{ver}^R$, N, the decrypted message data, and |C|, wherein $K_{ver}^R$ is a result of a key generation procedure using a common key K.

12. The system of claim 11, further comprising:
a means for exchanging a tuple $(C, A, R, N, \hat{N}, \hat{Z})$, between the first component and the second component, on the transport layer of the bus system, where $\hat{N}$ is a message counter for Δ-last messages, and $\hat{Z}$ is a last session counter for Δ-last messages.

13. The system of claim 12, further comprising:
a means for allowing the Δ-last messages to be lost in a transmission, from the first component to the second component, without informing an application layer above, wherein the first component transmits a current session counter pair (N, Z) and a pair $(\hat{N},\hat{Z})$ so that a check is enabled at the receiver.

14. The system of claim 13, further comprising:
a means for generating and securely filing a common key K during the production and assembly of the self-service automat on the basis of certificates from a public key infrastructure (PKI), wherein a calculating unit uses the common key K for at least one of authentication and encryption.

15. The system of claim 14, further comprising:
a Trusted Platform Module (TPM) in which the common key K is filed.

16. The system of claim 14, wherein the calculating unit determines at least one of A and C, wherein A:=AUTH$[K_{auth}^R, N, M, |M|]$, where $K_{auth}^R$ is a result of a secure authentication calculation using the common key K, and C:=ENC$[K_{enc}^R, Z, N, M]$ where $K_{enc}^R$ is a result of a secure encryption calculation using the common key K.

17. The system of claim 11, wherein the first computing unit determines whether the message counter N is less than a maximum message counter $N_{max}$, and upon determining whether N is less than $N_{max}$, the first computing unit sets N:=N+1.

18. The system of claim 11, wherein the self-service automat is an automated teller machine (ATM).

19. The system of claim 11, wherein the bus system is a universal serial bus (USB) with wired or wireless operation.

* * * * *